(12) United States Patent
Bojsen

(10) Patent No.: US 10,342,177 B2
(45) Date of Patent: Jul. 9, 2019

(54) CROP ENGAGING ELEMENT FOR A COMBINE HARVESTER SEPARATING ROTOR

(71) Applicant: AGCO International GmbH, Neuhausen (CH)

(72) Inventor: Thomas Mygind Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 81 days.

(21) Appl. No.: 15/551,221

(22) PCT Filed: Jan. 4, 2016

(86) PCT No.: PCT/EP2016/050007
§ 371 (c)(1),
(2) Date: Aug. 15, 2017

(87) PCT Pub. No.: WO2016/134859
PCT Pub. Date: Sep. 1, 2016

(65) Prior Publication Data
US 2018/0027737 A1   Feb. 1, 2018

(30) Foreign Application Priority Data
Feb. 25, 2015   (GB) .................................. 1503117.2

(51) Int. Cl.
*A01F 12/22*   (2006.01)
*A01F 7/06*   (2006.01)
(Continued)

(52) U.S. Cl.
CPC ................ *A01F 12/22* (2013.01); *A01F 7/06* (2013.01); *A01F 12/395* (2013.01); *A01D 41/14* (2013.01);
(Continued)

(58) Field of Classification Search
CPC .......... A01F 12/22; A01F 12/395; A01F 7/06; A01F 12/46; A01F 12/446; A01F 12/10; A01F 12/39; A01D 41/14
(Continued)

(56) References Cited

U.S. PATENT DOCUMENTS 927,331 A * 7/1909 Dagel ..................... A01F 12/22
460/122
4,581,880 A   4/1986 Klinner
(Continued)

FOREIGN PATENT DOCUMENTS

BR   9201725 A    12/1992
EP   2359677 A2    8/2011
(Continued)

OTHER PUBLICATIONS

UK Intellectual Property Office, International Search Report for related UK Application No. GB1503117.2, dated Aug. 13, 2015.
(Continued)

*Primary Examiner* — Arpad Fabian-Kovacs

(57) ABSTRACT

A separating rotor with a rotor tube for use on a combine harvester has a plurality of crop engaging finger elements. Each finger element is mounted to a respective finger support which is secured to the rotor tube. Each finger element has a planar body with a flared base portion which presents a leading edge to the crop material with a relatively shallow angle with respect to the tube.

9 Claims, 3 Drawing Sheets

(51) Int. Cl.
*A01F 12/395* (2006.01)
*A01F 12/39* (2006.01)
*A01D 41/14* (2006.01)
*A01F 12/10* (2006.01)
*A01F 12/44* (2006.01)
*A01F 12/46* (2006.01)

(52) U.S. Cl.
CPC .............. *A01F 12/10* (2013.01); *A01F 12/39* (2013.01); *A01F 12/446* (2013.01); *A01F 12/46* (2013.01)

(58) Field of Classification Search
USPC .......................................................... 460/69
See application file for complete search history.

(56) References Cited

U.S. PATENT DOCUMENTS

| | | | | |
|---|---|---|---|---|
| 4,889,517 A * | 12/1989 | Strong | .................. | A01F 7/06 460/66 |
| 4,946,419 A * | 8/1990 | Cromheecke | ............ | A01F 7/06 460/122 |
| 5,112,279 A * | 5/1992 | Jensen | ................. | A01F 12/442 460/69 |
| 5,152,717 A * | 10/1992 | Nelson | ................. | A01F 12/442 460/110 |
| 5,334,093 A * | 8/1994 | Jensen | ................. | A01F 12/442 460/107 |
| 5,342,239 A * | 8/1994 | West | ....................... | A01F 12/22 460/110 |
| 6,375,564 B1 * | 4/2002 | Amann | ................... | A01F 7/06 460/121 |
| 6,503,143 B2 * | 1/2003 | Gerber | ................ | A01D 61/008 460/113 |
| 7,390,252 B1 * | 6/2008 | Tanis | ....................... | A01F 7/06 460/68 |
| 7,682,236 B2 * | 3/2010 | Buermann | .............. | A01F 7/067 460/109 |
| 7,717,777 B2 * | 5/2010 | Pope | ...................... | A01F 7/067 460/69 |
| 8,075,377 B2 * | 12/2011 | Pope | ...................... | A01F 7/067 460/66 |
| 8,231,446 B2 * | 7/2012 | Pope | ...................... | A01F 7/067 460/62 |
| 9,198,358 B2 * | 12/2015 | Hollatz | .................... | A01F 7/02 |
| 2007/0049366 A1 * | 3/2007 | Pope | ...................... | A01F 7/06 460/68 |
| 2008/0167100 A1 * | 7/2008 | Farley | ..................... | A01F 12/22 460/71 |
| 2009/0011807 A1 * | 1/2009 | Becker | .................... | A01F 7/067 460/59 |
| 2011/0207511 A1 * | 8/2011 | Schwersmann | ........... | A01F 7/06 460/81 |

FOREIGN PATENT DOCUMENTS

| | | |
|---|---|---|
| FR | 516100 A | 4/1921 |
| JP | S62164744 U | 10/1987 |
| WO | 88/07812 A1 | 10/1988 |
| WO | 2012110347 A1 | 8/2012 |

OTHER PUBLICATIONS

European Patent Office, International Search Report for related International Application No. PCT/EP2016/050007, dated Apr. 18, 2016.

\* cited by examiner

CROP ENGAGING ELEMENT FOR A COMBINE HARVESTER SEPARATING ROTOR

FIELD OF INVENTION

The invention relates to combine harvester grain separating systems and particularly to axial flow separating rotors comprising a rotor tube and a plurality of crop engaging elements secured to the rotor tube.

BACKGROUND

For many decades self-propelled combine harvesters have been used by farmers to harvest a wide range of crops including cereals, maize and oil seed rape. Typically a combine harvester cuts the crop material, threshes the grain therefrom, separates the grain from the straw and cleans the grain before storing in an on-board tank. Straw and crop residue is ejected from the rear of the machine.

The crop processor of a combine harvester comprises threshing and separating apparatus. The separating apparatus is traditionally based upon one of two well-established systems. In a first known system straw walkers are used to 'walk' the crop stream rearwardly in the combine wherein agitation caused by this movement causes the grain to fall through an integrated grate whilst the straw residue falls from the rear and out of the combine. In the second alternative system cylindrical rotors are mounted within the combine longitudinally and enclosed by rotor cages wherein crop fed in at the front travels rearwardly in an axially spiral motion due to interacting crop engaging elements fitted to the rotor tube and guide vanes fitted on the inside of the rotor cage. The cylindrical rotors can provide a threshing and separating action, or a separating action only. Separated grain falls through a grate in the cage whilst the straw residue is conveyed rearwardly and out of the machine. The invention is concerned with this second system of separating apparatus.

SUMMARY OF INVENTION

It is an object of the invention to improve the design of the crop engaging elements with a view to improving the performance of the separating rotors and/or reduce the power consumption without adversely affecting the capacity.

In accordance with the invention there is provided a crop engaging finger element for attachment to a finger support on a combine harvester separating rotor, the finger element comprising a planar body comprising a base edge for contacting a rotor tube, a flared base portion and two long edges each including a non-zero flare angle, wherein the flare angle is greater on one of said two long edges than the other of said two long edges.

The rotor finger in accordance with the invention comprises a flared leading edge when attached to a rotor tube. The flared edge, and the resultant reduced angle between the leading corner of the base edge and the rotor tube reduces the abruptness by which the crop material is lifted from the surface of the rotor tube for rearward conveyance and thus reduces the opportunity for the crop material to get stuck on the entry point of the crop engaging finger. In turn this improves the crop flow conveyance and reduces power consumption.

Furthermore the provision of a finger element with a flared base delivers improved stability and can, advantageously, be fastened to a rotor with a single bolt. The flared base of the planar body improves the stability of the finger element by increasing the fore and aft support, therefore reducing the stresses placed upon any weld seams associated with the finger support and the rotor tube. Also, the flared or widened base reduces the risk of the finger element twisting under high loads.

The base portion of the finger element defines a base edge which is the closest part of the finger element to the rotor tube when attached. The planar body of the finger element comprises an elongate axis which preferably extends non-orthogonally to the base edge thus presenting a non-symmetrical profile with respect to the elongate axis. The body comprises two long edges aligned in the general direction of the elongate axis wherein each long edge includes a non-zero flare angle associated with the flared base portion. The flare angle is greater on one of said of two long edges than the other of said two long edges thus presenting the asymmetrical profile.

The base portion of the finger element preferably comprises a pair of feet which define a gap therebetween along the base edge. The flared base portion with two feet and the non-orthogonal elongate axis present a generally italic style A-shaped profile.

A separating rotor for a combine harvester comprising a rotor tube may comprise a plurality of the finger elements described above wherein each finger element is mounted to a respective finger support which is secured to the rotor tube. The finger supports are preferably arranged on the rotor tube in a plurality of helical rows.

The finger elements are preferably bolted to their respective finger supports.

The separating rotor has a direction of rotation on its axis and defines a front end and a rear end with respect to the general direction of crop conveyance. The elongate axis of each finger element preferably leans away from a radial axis both rearwardly and backwardly with respect to the direction of rotation.

The flared base portion includes a leading edge with respect to a general direction of crop conveyance wherein the leading edge preferably resides closer to a hypothetical tangential plane than a hypothetical radial plane, each hypothetical plane coinciding with the base of the leading edge. The leading edge more preferably lays within 20° of the tangential plane. Advantageously, the edge of the flared base is close to a tangent of the rotor tube thus providing a smooth guiding edge for the crop material and delivers a favourable saving in power consumption. In other words, the crop material encounters a less severe change of direction thus improving the crop flow.

The base edge of each finger element is preferably in contact with the rotor tube thereby reducing the risk of crop material becoming lodged in any gap at the base. The finger elements are preferably bolted to their respective finger support so as to preload the base against the rotor tube. The finger element is preferably over-sized, or has a profile which prevents the finger element from completely abutting the finger support without deformation thereof. In other words, the profile of the finger element is such that the action of bolting to the finger support forces the base edge against the surface of the rotor tube thus preloading the finger and further reducing the gap between the finger and the rotor tube. Again, this reduces the risk of material becoming trapped at the interface between the replaceable finger element and the surface of the rotor tube.

A pair of crop processing rotors having finger elements in accordance with the invention may be included in a twin axial combine harvester, the rotors being arranged fore and aft in a side-by-side relationship and having a drive mechanism which is arranged to drive the rotors in opposite directions. In this case, the planar construction of the finger elements makes them reversible so that the same component can be used for both the left-hand and right-hand rotors this saving on the part count.

BRIEF DESCRIPTION OF DRAWINGS

Further advantages of the invention will become apparent from reading the following description of a specific embodiment with reference to the appended drawings in which.

DETAILED DESCRIPTION OF A SPECIFIC EMBODIMENT

An example embodiment of the invention will now described. Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the rotation axis of the rotor.

Figure 1:
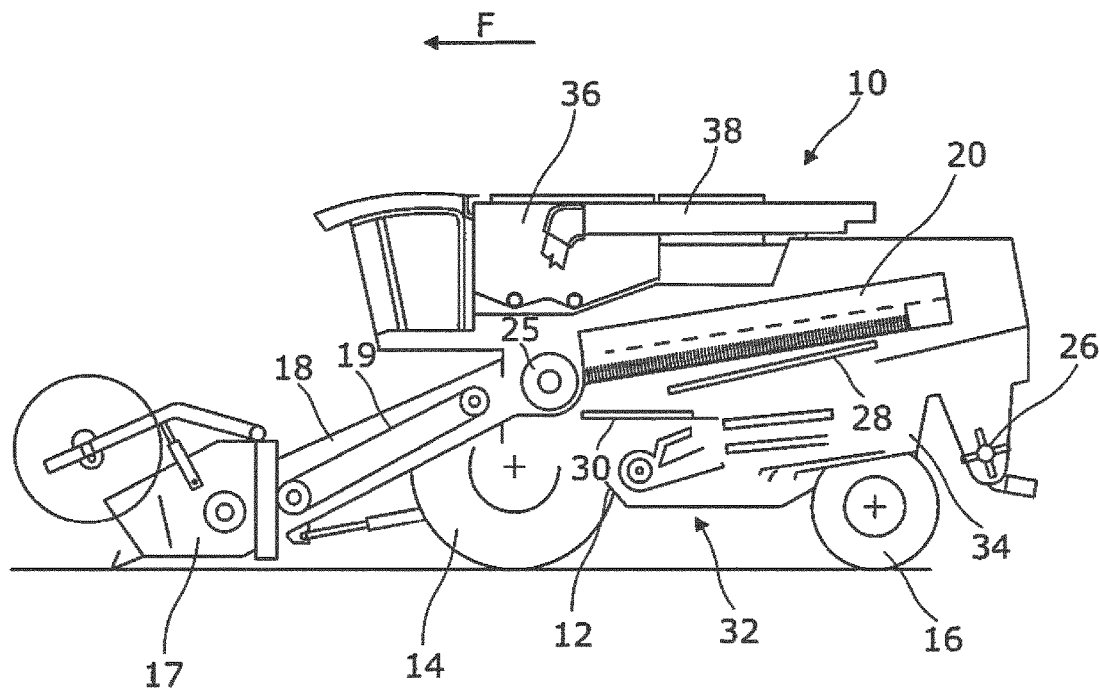
FIG. 1 is a schematic side view of combine harvester comprising a twin axial-flow crop processor.

With reference to FIG. 1 a combine harvester 10 includes a frame 12, front wheels 14 and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, corn and grass seed. The following description will make reference to various parts of the cereal crop stream but it should be understood that this is by way of example only and does not by any means limit the applicability of the invention to harvester other harvesting crops.

The cut crop stream is conveyed rearwardly from the feederhouse 18 to a processor designated generally at 20. The processor 20 includes a pair of axial flow threshing and separating rotors 22 which are arranged side by said and are fed at their front end by a feed beater 25. Axial flow rotors 24 serve to thresh the crop stream in a front 'threshing' region, separate the grain therefrom in a rear 'separating' region, and eject the straw residue through the rear of the machine either directly onto the ground in a windrow or via a straw chopper 26.

A concaved grate in the underside of the rotor 24 allows the separated material to fall by gravity onto return pan 28 located below. Return pan 28 comprises a tray-like structure and serves to convey the collected grain forwardly to a front edge from where the grain falls on to a grain pan 30. The collected mix of grain kernels, chaff, unthreshed tailings and shorter straw is conveyed rearwardly by grain pan 30 into a cleaning unit designated generally at 32.

Cleaning unit 32 is of a known construction and includes oscillating sieves which sort the crop material, ultimately ejecting residue through the rear of the machine 34 whilst the clean grain is conveyed by a (not shown) elevator to an on-board storage tank 36. For completeness, the combine 10 includes an unloading system which includes an unloading auger 38 shown in part in FIG. 1.

Figure 2:
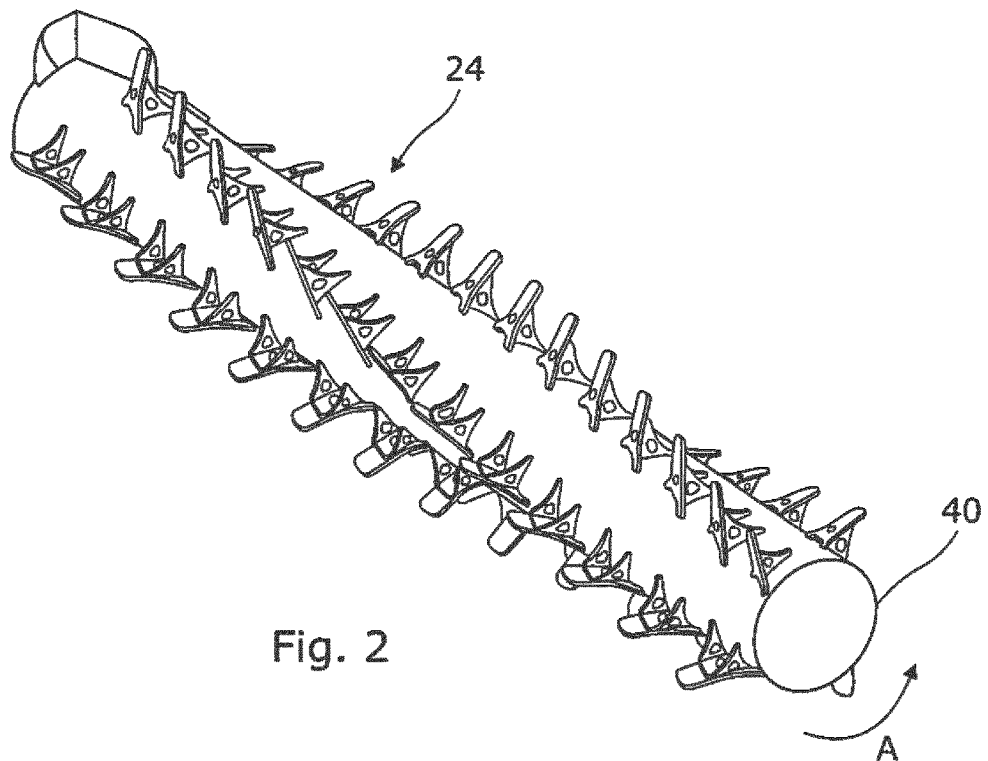
FIG. 2 is a perspective front view of a rear 'separating' section of a crop processing rotor in accordance with an embodiment of the invention.
Figure 3:
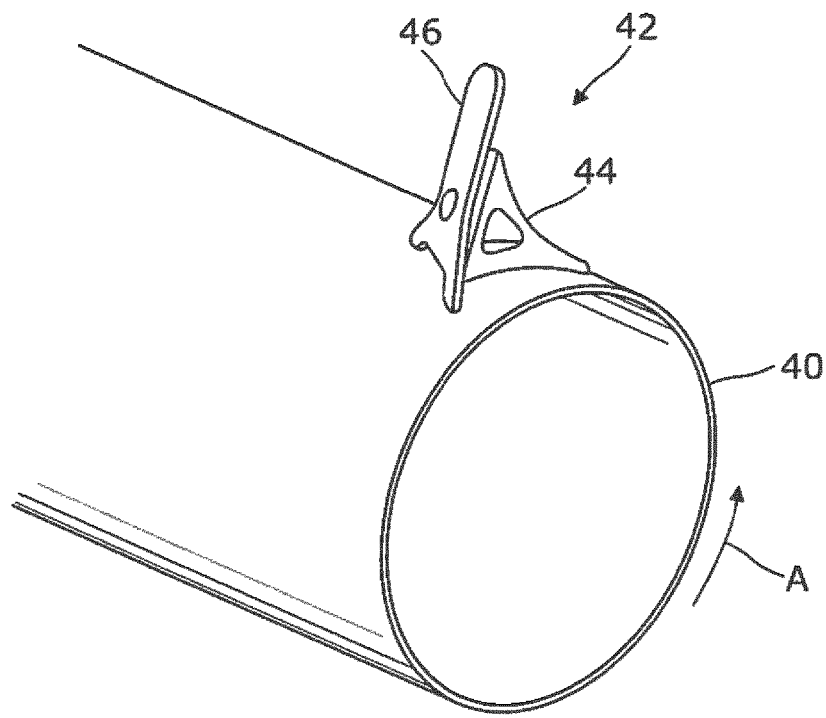
FIG. 3 shows a perspective view of a single crop engaging element mounted to a rotor tube.

The invention relates to the crop processor 20 and particularly to the rear separating portion of rotors 24 shown in FIG. 2. It should be understood that the illustrated processor is of the twin axial flow type comprising a feed beater 25 and pair of side by side threshing/separating rotors 24. However, the invention is also applicable to other processor types which include axial flow separating rotors such as those which comprise a conventional tangential flow threshing cylinder with one or two axial flow separating rotors disposed downstream (hybrid).

It should be understood that FIG. 2 shows only the rear section of rotor 24, the rear section serving to separate the threshed grain from the straw residue. The upstream threshing section is not shown. Separating rotor 24 includes a cylindrical tube 40 formed from sheet steel. Secured to the tube 40 are a plurality of crop engaging elements arranged in four helical rows. Rotor 24, shown in FIG. 2, is the right-hand rotor of the pair of rotors, the shown rotor having a direction of rotation indicated by arrow A. The crop engaging elements in conjunction with guide vanes, located on the inside of the rotor cage (not shown), convey the crop stream or mat in a front to rear helical path.

FIGS. 3 to 6 show a single crop engaging element 42. It should be understood that the following description of the crop engaging element applies to the other crop engaging elements mounted to the rotor tube 40.

The crop engaging element comprise a finger support 44 and a crop engaging finger element 46 bolted thereto. The finger support 44 is made, for example, from sheet steel, comprises three sides and is welded along a base edge to the rotor tube 40. Said three sides include a middle finger element support plate 47 and two side support portions 48. The finger supports 44 are welded to the tube 40 wherein the position determines the location of the crop engaging finger elements 46.

Figure 7:
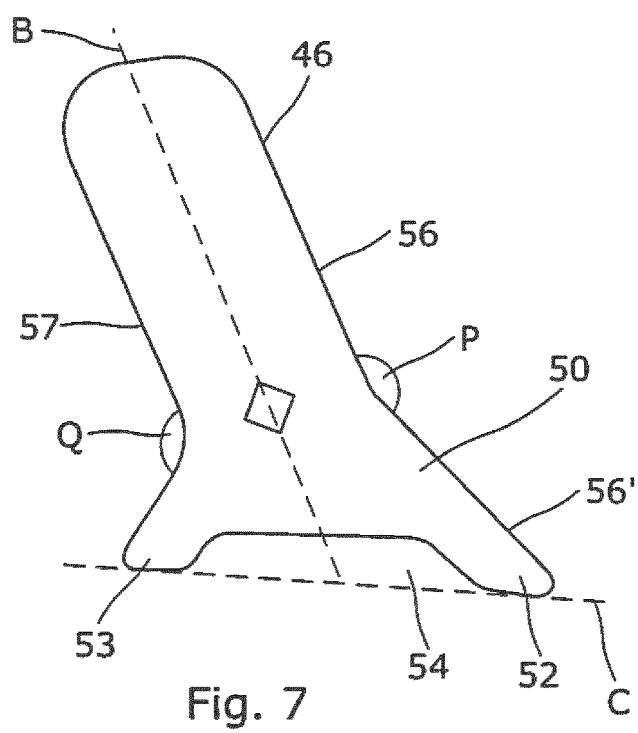
FIG. 7 shows the profile of a finger element in isolation.

The finger elements are planar and are cut from sheet steel using laser cutting for example. With reference to FIG. 7, each finger element 46 defines an elongate axis B corresponding to the general direction of extension of the finger element from the base C.

The planar body includes a flared base portion 50 so that the width of the finger element 46 along the base edge C is significantly wider than the upper portion. The base portion 50 has a profile that defines a pair of feet 52, 53 which define a gap 54 therebetween along the base edge C. The flared base 50 delivers a robust structure and reduces the twisting forces on the bolted connection.

As can be seen in FIG. 7, the elongate axis B extends non-orthogonally to the base edge C thus presenting an asymmetric profile about axis B. Being a planar structure, the finger supports 46 for the left and right hand rotors are identical because of the freedom to reverse such.

The body of finger element 46 comprises a front long edge 56 and rear long edge 57 each including a flare angle P and Q respectively. The flare angle P on the front edge 56 is greater than flare angle Q on rear edge 57.

Figures 4, 5:
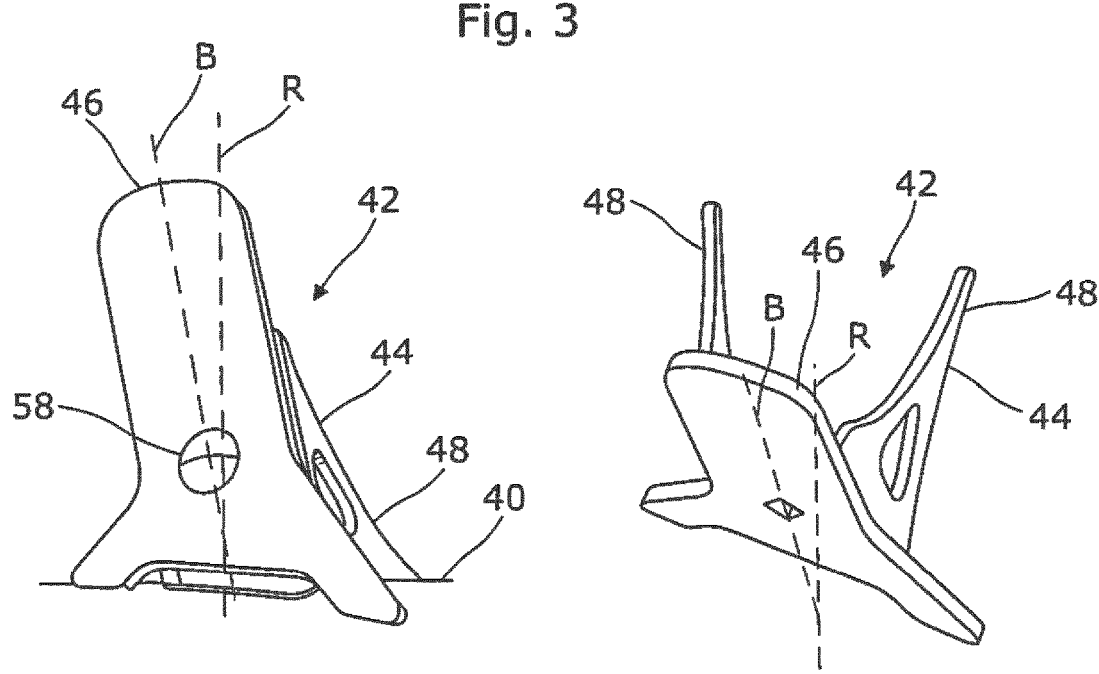
FIG. 4 shows a side view of the crop engaging element of FIG. 3.
FIG. 5 shows a top view of the crop engaging element of FIG. 3.
Figure 6:
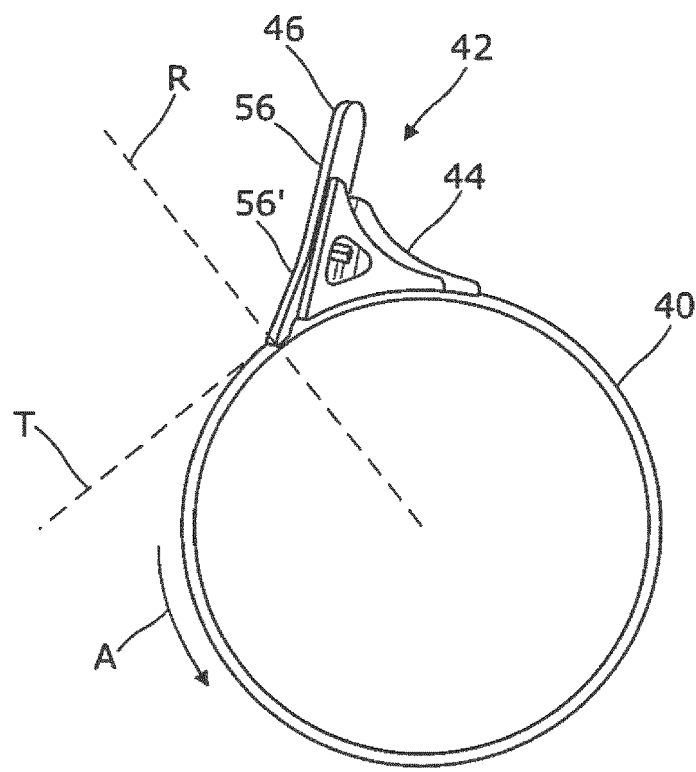
FIG. 6 shows an end-on view of the crop engaging element of FIG. 3.

When mounted to the finger supports 44, the elongate axis B of finger elements 46 leans away from a radial axis or plane R both rearwardly and backwardly with respect to the direction of rotation A, and as best seen in FIGS. 4 and 6. Such angular positioning ensures engagement of the crop material and conveyance in the desired direction.

The leading edge 56' of the flared base portion 50 is aligned closer to a hypothetical tangential plane T than to hypothetical radial plane R as best seen in FIG. 6. This presents a smooth transition for crop material when encountering the crop engaging element 42 in rotation. It is thought that the shallower angle presented at the base of the leading edge of the flared section 50 is the reason for the lower power consumption resulting from testing the apparatus, due at least in part to the reduction in trapped crop material.

The finger element 46 is bolted to the corresponding finger support 44 by bolt 58. The profile of finger element 46 can be considered as oversized, wherein, during assembly, when offered up to the finger support 44, a gap initially exists between finger support plate 47 and finger element 46. As the bolt 58 is tightened the base portion 50 deforms slightly so as to preload the feet 52, 53 against the rotor tube 40. Advantageously, this delivers a tight fit between the base of finger element 46 and the surface of rotor tube 40 thus reducing the risk of straw material becoming trapped along the base edge and presenting a smoother transition surface.

In summary there is provided a combine harvester comprising a separating rotor with a rotor tube and a plurality of crop engaging finger elements. Each finger element is mounted to a respective finger support which is secured to the rotor tube. The finger element comprises a planar body with a flared base portion which presents a leading edge to the crop material with a relatively shallow angle with respect to the tube.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A separating rotor for a combine harvester comprising:
a rotor tube; and
a plurality of crop engaging finger elements, each finger element comprising a planar body having an upper body and a flared base portion, said flared base portion providing a widened base with a base edge, for contacting the rotor tube, wherein the widened base is wider than the upper portion, said planar body further comprising two long edges, each long edge having a respective flare angle between a part of the long edge associated with the upper body and a part of the long edge associated with the flared base portion, and wherein each flare angle is greater on one of said long edges than the flare angle on the other of said long edges, the one said long edge being a leading edge with respect to a general direction of crop conveyance, and wherein each finger element is mounted to a respective finger support which is secured to the rotor tube;
wherein the part of the long edge of the leading edge associated with the flared base portion resides closer to a tangential plane which is tangential to the surface of the rotor tube than a radial plane of the rotor tube, wherein the tangential plane and the radial plane coincide with the widened base of the planar body.

2. The separating rotor according to claim 1, wherein the finger supports are arranged on the rotor tube in a plurality of helical rows.

3. The separating rotor according to claim 1, wherein the finger elements are bolted to their respective finger support.

4. The separating rotor according to claim 1, having a direction of rotation, a front end and a rear end defined by a general direction of crop conveyance, wherein an elongate axis of each finger element leans away from a radial axis both rearward and backward with respect to the direction of rotation.

5. The separating rotor according to claim 1, wherein the lower flared portion of the leading edge resides within 20 degrees of the tangential plane.

6. The separating rotor according to claim 1, wherein the base edge of each finger element is in contact with the rotor tube.

7. The separating rotor according to claim 6, wherein the finger elements are bolted to their respective finger support so as to pre-load the base edge against the rotor tube.

8. The separating rotor according to claim 6, wherein the finger element is oversized to prevent such from completely abutting the finger support without deformation of the finger element.

9. A combine harvester comprising the separating rotor in accordance with claim 1.

* * * * *